United States Patent [19]
Eul et al.

[11] Patent Number: 5,362,868
[45] Date of Patent: Nov. 8, 1994

[54] THINNING OF GRANULAR STARCH

[75] Inventors: Wilfried Eul, Ramsey, N.J.; Hans-Ulrich Suess, Gondsroth, Germany

[73] Assignee: Degussa Aktiengesellshaft, Frankfurt am Main, Germany

[21] Appl. No.: 77,914

[22] Filed: Jun. 18, 1993

[51] Int. Cl.$^5$ .............. C08B 31/00; C08B 33/00; C08B 35/00; C13K 1/06

[52] U.S. Cl. .................... 536/102; 536/124; 127/36; 127/38; 127/70; 127/71

[58] Field of Search ............... 536/102, 124; 127/36, 127/38, 70, 71

[56] References Cited

U.S. PATENT DOCUMENTS 3,975,206  8/1976  Lotzgesell et al. ............ 127/71
4,838,944  6/1989  Kruger ......................... 127/71

Primary Examiner—Nathan M. Nutter
Attorney, Agent, or Firm—Beveridge, DeGrandi, Weilacher & Young

[57] ABSTRACT

A process is disclosed for thinning granular starch in an aqueous slurry employing a source of peracid without using metal catalysts. The thinning process is aimed at modifying granular starches by lowering viscosity/increasing alkaline fluidity. It can also be employed immediately before or during cooking (gelatinization) of starch. Sources of peracids are peroxomonosulfuric acid (Caro's acid) or organic peracids such as performic, peracetic or perpropionic acid. Reaction time and temperature are lower than for existing process while product properties are improved.

38 Claims, No Drawings

THINNING OF GRANULAR STARCH

BACKGROUND AND INTRODUCTION

The present invention relates to a process for thinning of granular starch. More particularly, the invention relates to a process of thinning starch in an aqueous slurry employing a source of peracid without using a metal catalyst and in obtaining a desired product in a shorter reaction time.

Native starch, before it can be used in most industrial applications, must undergo an extensive chemical treatment in order to change its properties for the specific use intended. One of the key processes is the degradation of starches to obtain a desired viscosity to thereby enable its use in a variety of industries, such as wallboard binders, paper and board production, textile sizing, production of food and food additives, as well as other uses.

Degradation of starch is also called conversion or thinning of starch. The starch molecules are split into smaller molecules by various measures which shift the molecular weight distribution to lower molecular weights and lower viscosities. Applied to granular starches, the viscosity is modified to obtain more easily desintegratable granules.

The thinning process results in modified hot paste viscosity of starches and starch derivatives, but is not targeted at obtaining completely water-soluble starches if the modified starches are to be stored afterwards as dry powder or as a slurry.

After the thinning process, the starches are filtered, washed and dried or further processed in a wet stage or as a slurry.

The process can be used, however, as an integrated step before or during starch cooking (gelatinization) by the industrial end user where the gelatinized or solubilized starch, after thinning, is immediately used.

The industrial methods which are predominantly used today to obtain granular starches after thinning are oxidative degradation with hypochlorite and acid hydrolysis, mostly with sulfuric acid or HCl. Both methods have major disadvantages which are well known to the industry: The hypochlorite oxidation and the acid hydrolysis cause major pollution in the effluents from starch manufacturing plants because of the high salt load and, more importantly, the large quantities of dissolved organics which are measured as Chemical Oxygen Demand (COD). A reason for the high effluent load in both processes is the very long reaction time of 4–15 hours at elevated temperatures (up to 60° C.) which dissolves large quantities of organic materials and reduces the yield of the process.

Many attempts have been made to alleviate these problems and to find other ways of starch thinning. One of the most promising technologies was the use of hydrogen peroxide with metal catalysts which somewhat reduces reaction time and temperature. The use of metal catalysts, however, causes other problems. The heavy metal content in thinned starches causes significant and undesirable coloration after gelatinization. Therefore, $H_2O_2$/heavy metal catalyzed starch thinning can only be used for low-grade starches where the brightness and/or metal content of the thinned and/or cooked starches is not crucial.

Additional treatments such as washing with chelating agents (EDTA, DTPA, phosphonates, etc.) have only limited success because the starch itself has good complexing characteristics and retains most of the heavy metal added as catalyst. Not only is the color from the remaining heavy metals after cooking the starch at the end user a problem, but also the toxicity of the metals (especially in the case of copper). Some of the heavy metal catalysts also end up in the plant effluent causing environmental problems.

The use of small amounts of hydrogen peroxide, peracetic acid and peroxide sulfate ($S_2O_2^{2-}$, commonly called persulfate) for bleaching of starch is described by Whistler et al. (Starch, Chemistry and Technology, 2nd. Edition, Edited by Whistler, R. L., BeMiller, J. N., Paschall, E. F., Academic Press, New York, 1984) and in the literature referenced therein, where bleaching is defined as increase of brightness of starch without significantly altering its supramolecular structure (which would show up as a different molecular weight distribution, viscosity or alkaline fluidity). In contrast, starch thinning has the goal of the lowering/alteration of supramolecular structure, molecular weight distribution, viscosity or alkaline fluidity, and brightening can be a desired side effect.

Whistler et al. (Starch, Chemistry and Technology, 2nd. Edition, Edited by Whistler, R. L., BeMiller, J. N., Paschall, E. F., Academic Press, New York, 1984) describe the use of ammonium-persulfate ($(NH_4)_2S_2O_8$) in paper mills for the preparation of high solids, low viscosity aqueous dispersions of degraded starch for coating and sizing operations. In such an application, the starch is directly processed on site by the end user without filtering and washing, cooked beyond the gelatinization point and immediately used.

A similar application is reported by Whistler et al. ("Oxidation of Amylopectin with $H_2O_2$ at Different Hydrogen Ion Concentrations", IACS (1959), volume 81, pages 3136–3139) and the literature referenced therein for hydrogen peroxide in a continuous thermal cooking process, the pH is between 1 and 14, and the starch is cooked beyond the gelatinization point.

Hebeish et al. ("Action of Hydrogen Peroxide in Strongly Alkaline Solutions on Rice Starch," Starch/Stärke (1984), volume 36, no. 10, pages 344–349) report the use of alkaline $H_2O_2$ solutions in strongly alkaline solutions (pH>12) at elevated temperatures (up to 95° C.) to lower the viscosity while a significant part of the starch is completely solubilized.

Fleche, G. ("Chemical Modification and Degradation of Starch," Food Sci. Technol. (1985), volume 14, pages 73–99.) also reports the use of ammonium persulfate, potassium permanganate and hydrogen peroxide as a low reagent treatment for bleaching of starch compared to conventional oxidation with hypochlorite.

The mechanism of heavy metal catalysis in oxidative degradation of cellulose model compounds is discussed by Blattner et al. ("Effects of Iron, Copper and Chromate Ions on the Oxidative Degradation of Cellulose Model Compounds," Carbohydrate Research (1985), volume 138, pages 73–82).

The use of metal catalyzed hydrogen peroxide in thinning of granular starches is disclosed in various patents:

U.S. Pat. No. 3,475,215 is a process for continuous acid hydrolysis and/or oxidation of starch for use in coating compositions. The starch is simultaneously cooked above the gelatinization point; acid, catalyst (inorganic salts) and hydrogen peroxide, perborates, percarbonates, persilicates or persulfates are added for oxidation and the processed gel used immediately.

U.S. Pat. No. 3,539,366 describes a method for pasting starch at temperatures of 150° C./300° F. to 175° C./350° F. in the presence of hydrogen peroxide.

U.S. Pat. No. 3,775,144 uses hydrogen peroxide for viscosity adjustment for corn flour in paper sizing.

U.S. Pat. No. 3,935,187 is a process of depolymerizing granular starch with 0.5 to 2.0% hydrogen peroxide and 0.0005% to 0.025% cupric ions as catalyst.

U.S. Pat. No. 3,975,206 employs hydrogen peroxide in the absence of buffering agents at acidic pH and temperatures well below the gelatinization point and small amounts of iron catalyst.

U.S. Pat. No. 4,838,944 discloses a process to degrade granular starches at temperatures of 0° to 55° C., alkaline pH 11.0 to 12.5 with hydrogen peroxide and manganese ions as catalyst.

U.S. Pat. No. 5,468,660 describes a process of reacting various polysaccharides including starch with 30–50% hydrogen peroxide (100%) based on dry polysaccharide to depolymerize the molecules and obtain viscosities at 25° C. below 9500 mPa-s. The product after oxidative depolymerization is a low viscosity aqueous suspension with solids content of greater than 5% dry solids.

From the literature cited and the aforementioned problems with hypochlorite thinning or heavy metal peroxide thinning, it can be seen that there is still a need for a commercially useful process for thinning starch which achieves the following objects:

1. Free of heavy metals.
2. Capable of operation at lower temperatures than existing processes.
3. Does not extend and even shortens reaction times compared to existing processes.
4. Does not increase and even lowers the effluent load with inorganic salts and COD after flotation of the thinned starch.
5. Allows existing equipment in starch plants to be used and thus does not require major investment in new equipment.

An investigation to overcome the problems with metal catalyzed $H_2O_2$ thinning of granular starch, and to achieve the above-identified objects, led to the present invention.

SUMMARY OF THE INVENTION

An object of the present invention is to provide a process for oxidative thinning of granular starch without employing heavy metal catalysts. In achieving the above and other objects, one feature of the invention resides in a process for thinning granular starch comprising treating an aqueous slurry of a source of starch with a source of peracid at a temperature below about 55° C., preferably before complete gelatinization of said starch, to lower viscosity and increase alkaline fluidity thereof. The pH for the thinning processes must remain below the gelatinization/pasting pH which is for most starches and starch derivatives below pH 8.0 to 12.5, depending on temperature. The process is carried out free of any metal catalyst.

Another feature of the present invention relates to a thinning process which is carried out at the location of use where starch needs to be pasted (cooked) and is immediately consumed, the process temperature can be the same or higher than the pasting temperature and also the pH can be the same or higher than the gelatinization/pasting pH.

Other aspects and features of the invention are described hereinafter.

DETAILED DESCRIPTION OF THE INVENTION

In carrying out the process of the present invention, any source of starch may be used, including corn, potato, wheat, rice, sago, tapioca, waxy maize sorghum, high amylose corn, and the like. Hence, as used herein, the expression "source of starch" includes the above as well as any derivatives of starch such as cationized, anionized, ethoxylated or hydroxyethylated starches or esters of starch, provided the starches are in granular form before the thinning process. The oxidatively thinned starches obtained by the present invention have properties comparable to those of acid-treated starches or to those of hypochlorite-oxidized starches.

The process of the present invention surprisingly requires much shorter reaction times than prior art processes, lower temperatures, and does not employ any heavy metal catalysts. The consequence of this new process is lower energy demand, higher productivity, no heavy metals in the effluent, and lower dissolved organic content in wash water.

An advantage of the present invention resides in utilizing existing plant equipment of the industry without major modification. The required chemicals can be either supplied from outside or generated on site from readily available raw materials.

The thinning reaction of the present invention is carried out by mixing the source of starch, typically in the form of an aqueous slurry, with the peracid and is easily controlled by measuring the alkaline fluidity level (e.g., the desired fluidity is 60 to 70 ml), the viscosity, or molecular weight distribution of the starch as it is the common practice in starch processing. When the desired fluidity is obtained, the reaction can be stopped by either cooling, changing the pH or chemical neutralization of the oxidation reagent with metabisulfite, thiosulfate, enzymes (such as catalase), other peroxide scavengers or by combinations of the aforementioned methods.

The concentration of the starch in the aqueous slurry is conventional and is shown in the art of record which is relied on for that disclosure.

It is also possible to combine this new thinning method with any other prior art thinning method, such as metal catalyzed hydrogen peroxide, hypochlorite, acid, enzyme or thermal thinning and degradation.

Fluidity/Viscosity Measurement

The determination of alkaline fluidity has been proven to be a most convenient method of controlling a thinning reaction and characterizing the viscosity of starches and starch derivatives for the production of thinned granular starches. There is an abundance of literature to convert various viscosity measurements (such as Brabender, Ubbelohde, Thomas) and alkaline fluidity into each other. The method for determining alkaline fluidity utilized herein is the one described in U.S. Pat. No. 3,975,206 (which is incorporated by reference in its entirety). All alkaline fluidities mentioned in this invention refer to 10 g dry starch and 2N NaOH.

Brightness and Color Measurement

The determination of brightness and color is adapted from standard procedures used in the pulp and paper industry and known to those skilled in the art.

After washing and filtration, the processed starch is air dried at room temperature for 48 hours on a drying rack. The filter cake is wrapped in clean, dry filter paper to avoid yellowing due to light or any exposure to dust or dirt. When the filter cake is completely dry, it is crumbled on clean, white paper and subsequently pulverized in a mortar. For pulverization, only gentle pressure should be applied. Approximately 15 g starch powder is weighed in a 3.5 inch petri dish and leveled with a spatula. Then a 500 g polished stainless steel or brass weight is slightly pressed on the starch and moved in circles to produce a smooth, even surface. It is important for an accurate measurement that no light shines thorough the sample. The sample is placed under a Zeiss Elrepho 2000 Datacolor instrument and measured under D65/10°R457 which gives a brightness value (expressed as reflection factor at 457 nm) between 0 and 100%, the yellowness and the CIELAB L*a*b* values. Four single measurements per sample are taken from different spots by moving the petri dish into other positions relative to the light source after each measurement.

Alkaline Fluidity Levels

It should be mentioned that any alkaline fluidity and corresponding viscosity can be obtained by extending the reaction time of the present process until the starch is completely dissolved in water. The higher the alkaline fluidity, the higher the yield loss and the higher the organic load of the filtrate, which contains the water solubilized part of the starch. For all practical purposes, and since most commercially available granular starches are sold in the 50–70 ml alkaline fluidity range, the examples mostly cover this area.

It should be noted that the thinning process of granular starch for subsequent storage and/or shipment is limited in temperature and pH. Both conditions have to be selected in a way that no pasting occurs. Therefore, all starch thinning processes which fall under the aforementioned category must be carried out at a temperature below the pasting (starch cooking) temperature which is between 55° and 70° C. for most starches and starch derivatives. Also, the pH for this category of thinning processes must remain below the gelatinization/pasting pH which is for most starches and starch derivatives below pH 8.0 to 12.5, depending on temperature.

However, if the thinning process is carried out at the location of use where starch needs to be pasted (cooked) anyway and is immediately consumed, the process temperature can be the same or higher than the pasting temperature and also the pH can be the same or higher than the gelatinization/pasting pH.

The active oxygen (Oa) added as peracid is generally 0.1 to ≦5%, preferably 0.1 to ≦2.5%, and more preferably 0.1 to ≦1%, based on dry starch. The pH is generally 0.2 to ≦12.5, preferably 0.2 to ≦8, and more preferably 0.2 to ≦6. The temperature is generally approximately 30° to ≦100° C. preferably approximately 30° to ≦70° C., and more preferably approximately 30° to ≦55° C. The reaction time is generally approximately 20 minutes to ≦5 hours, preferably approximately 20 minutes to ≦3 hours, and more preferably approximately 20 minutes to ≦2 hours.

When Caro's acid is used as the peracid, the Oa is generally 0.1 to ≦5%, preferably 0.1 to ≦2.5%, and more preferably 0.1 to ≦1%, based on dry starch. The pH is generally 0.2 to ≦12.5, preferably 0.2 to ≦8, and more preferably 0.2 to ≦4. The temperature is generally approximately 30° to ≦100° C., preferably approximately 30° to ≦70° C., and more preferably approximately 30° to <50° C. The reaction time is generally approximately 20 minutes to ≦5 hours, preferably approximately 20 minutes to ≦3 hours, and more preferably approximately 20 minutes to ≦2 hours.

When peracetic acid is used as the peracid, the Oa is generally approximately 2 to ≦5%, preferably approximately 2 to ≦4%, and more preferably approximately 2 to ≦3%, based on dry starch. The pH is generally 1 to ≦12.5, preferably 1 to ≦8, and more preferably 1 to ≦4. The temperature is generally approximately 30° to ≦100° C., preferably approximately 30° to ≦70° C., and more preferably approximately 30° to 50° C. The reaction time is generally 1 to ≦5 hours, preferably 1 to ≦3 hours, and more preferably 1 to ≦2 hours.

When peroxodisulfate is used as the peracid, the Oa is generally 0.5 to ≦5%, preferably 0.5 to ≦4%, and more preferably 0.5 to ≦3%, based on dry starch. The pH is generally 1 to ≦12.5, preferably 1 to ≦8, and more preferably 1 to ≦4. The temperature is generally approximately 30° to ≦100° C., preferably approximately 30° to ≦70° C., and more preferably approximately 30° to ≦60° C. The reaction time is generally 1 to ≦5 hours, preferably 1 to ≦3 hours, and more preferably 1 to ≦2 hours.

EXAMPLES

Results for Examples 1 through 6 are summarized in Table 1.

Example 1 (comparison)

This example illustrates the common industrial practice of acid thinning of granular starch which is currently being used to a large extent by the starch processing industry (Whistler et al., Starch, Chemistry and Technology, 2nd. Edition, Edited by Whistler, R. L., BeMiller, J. N., Paschall, E. F., Academic Press, New York, 1984):

A 35% solids-containing slurry of granular unmodified corn starch in an 800 ml beaker was prepared in water and immersed in a thermostated water bath at 55° C. After five minutes for temperature equilibration, the pH was adjusted with 10% sulfuric acid to 0.7 and the slurry maintained at 55° C. while stirring slowly. After 3, 4, 5, 6 and 7 hours, samples were taken from the reaction batch to determine alkaline fluidity and control the progress of the thinning process to achieve a target fluidity of 65 ml; a total reaction time of 6 hours was required to obtain a fluidity of 66 ml and 7 hours to obtain 71 ml. A fluidity of 80 ml is obtained after 10 hours reaction time.

The main batch of the reaction at the 66 ml fluidity level was removed from the heating bath, neutralized slowly with a saturated sodium bicarbonate solution to pH 7, filtered on Whatman #2 filter paper, and washed twice with 300 ml deionized water each. To achieve a satisfactory washing effect, it is important to add the wash water before the filter cake runs dry and cracks. Further procedures are described above under Brightness and Color Measurement.

The optical values for the 66 ml starch were brightness 88.3% R457, yellowness 7.5, L* 97.4, a* −0.3 and b* 4.2.

Example 2 (comparison)

Analogous to Example 1, a hydroxyethylated starch derivative based on waxy maize starch was thinned according to the acid process at an initial pH of 0.7. To obtain an alkaline fluidity level of 67 ml, the reaction time was 7 hours at 53° C. The brightness of the end product was 91.9% R457, yellowness 4.5, L* 98.2, a* −0.1, and b* 2.5.

Example 3 (comparison)

This trial represents a typical process for metal-catalyzed thinning of granular starch with hydrogen peroxide according to prior art (U.S. Pat. No. 3,975,206). Similar to Example 1, an unmodified granular corn starch slurry at 35% solids was immersed in a water bath at 45° C. After temperature equilibration, the pH was adjusted to 4.0 with 10% sulfuric acid; 0.2 g $FeSO_4.7H_2O$ were added, followed by 1.0% $H_2O_2$ (as $H_2O_2$ 100% on d.s.b. (hydrogen peroxide 100% added on a dry starch basis (100% dry)) addition. The alkaline fluidity was determined every 30 minutes until a level of 68 ml was reached. The required reaction time was 2.5 hours. No residual peroxide could be determined with test strips. The batch was split into two parts (a) and (b):

(a) was processed as previously described; brightness R457 was 79.1%, yellowness 11.5 L* 94.4, a* 0.6, b* 5.9. The starch clearly had a yellow color tint.
(b) to prevent the yellow coloration, the slurry was stirred at 35% solid content with 0.14% $Na_5DTPA$ chelant (100% $Na_5DTPA$ d.s.b.) for another 30 minutes, then filtered, washed and processed as described above. The yellow coloration could be removed somewhat, but was still visible. Brightness 83.1%, yellowness 8.1, L* 95.4, a* 0.3, b* 4.2.

Example 4 (comparison)

This example represents thinning of starch with hydrogen peroxide at the intrinsic pH of the starch slurry without a metal catalyst. A starch slurry at 35% solids was heated in a water bath at 50° C. and 1% $H_2O_2$ (100% basis on d.s.b.) was added. Initial pH was 5.1. After 8 hours reaction time, the alkaline fluidity was only 26 ml. The experiment was stopped because otherwise the reaction time would have been in excess of 15 hours which is unacceptable for industrial practices.

Example 5 (comparison)

5A. This example shows the thinning effect of hydrogen peroxide under very acidic conditions without a metal catalyst. A corn starch slurry at 35% d.s.b. was heated at 50° C., pH was adjusted to 0.7 with 10% sulfuric acid (same amount of acid as used for regular acid thinning), and 1% $H_2O_2$ (100% on d.s.b. ) was added. The reaction time was 6 hours to reach an alkaline fluidity level of 61 ml. Brightness was 92.1% R457, yellowness 4.6, L* 98.3, a* 0.0 and b* 2.5.

5B. The same experiment at 40° C. gave only a fluidity of 25 ml after 7.8 hours retention time.

Example 6

According to the process of the present invention, a 35% d.s.b. slurry of hydroxyethylated starch derivative was thinned at 40° C. or at 50° C. with various amounts of peroxomonosulfuric acid (Caro's acid, $H_2SO_5$). $H_2SO_5$ was prepared according to standard procedures described in the prior art literature (Ullmans' Encyclopedia of Technical Chemistry, 5th Edition, 1991, Volume A19, page 188) from 70% $H_2O_2$ and >96% $H_2SO_4$. The yield of $H_2SO_5$ by using laboratory preparation methods is typically within 40-80% based on added $H_2O_2$ while some hydrogen peroxide remains unreacted in the Caro's acid. The concentration of the two species is determined with standard laboratory methods familiar to those skilled in the art. Since Caro's acid is the active ingredient and hydrogen peroxide has only a limited effect, as can be easily seen from Example 5, the chemical addition expressed as active oxygen (Oa) is based on the Caro's acid content of the solution. 100% Caro's acid ($H_2SO_5$) has an Oa of 14%. The experiments were run with Oa additions of 0.5%, 0.6% and 0.8%. The thinning reaction was stopped after a target fluidity of 60-70 ml was reached. This was accomplished by adjusting the pH, lowering the temperature, filtering and washing as previously described. Results are summarized in Table 1. The reaction can also be stopped by adding peroxygen scavengers as mentioned previously.

At 40° C. reaction temperature, the reaction time was only between 0.5 and 2.0 hours to reach the desired fluidity level. The reaction time was only 20 minutes at 50° C. and by lowering the added amount of $H_2SO_5$ to 0.4% Oa, but the desired fluidity level was already exceeded; reaction times that short cannot be controlled properly because of the time requirement for alkaline fluidity determination. No further experiments were conducted at 50° C. with $H_2SO_5$ for this reason. However, lower charges of $H_2SO_5$, such as 0.1% to 0.3% Oa, can be used to bring the reaction time up to around 1 hour.

Results for Examples 7 through 10 are summarized in Table 2.

Example 7

To demonstrate the effect of pH on starch thinning with Caro's acid, a series of thinning experiments with the same hydroxyethylated starch derivative as in Example 6 were run at 0.5% Oa levels where the pH was adjusted to 1.0, 2.0, 4.0 and 6.0 after addition of $H_2SO_5$. This series shows that the reaction time can be adjusted by varying the pH, i.e., the higher the pH, the slower the reaction at the same Oa level. A slower reaction at higher pH (e.g., pH 6) can be accelerated somewhat by raising the temperature from 40° C. to 50° C.

Example 8

This experiment proves that instead of $H_2SO_5$, which must be prepared on site and cannot be shipped from a manufacturer, there may be used a potassium salt of Caro's acid, sold as Caroat® or Oxone®, or similar salts and salt solutions (DE 4,020,856 and WO 9,215,522) with the $HSO_5^-/SO_5^{2-}$ anion as active ingredient. Caroat® with the approximate formula $2KHSO_5.KHSO_4.K_2SO_4$ has an Oa content of approximately 4.8%. The same hydroxyethylated starch derivative as in Examples 6 and 7 was thinned at 40° C. under addition of 0.5% Oa as Caroat at the intrinsic pH after Caroat addition (8A) and at a pH of 1.2 (8B). Example 8B shows that lowering the pH to only 1.2 accelerates the reaction and brings fluidity beyond the typical target level.

Example 9

This experiment represents the use of an organic peracid such as peracetic acid for the thinning of starch. A commercially available 15% peracetic acid solution was used. The Oa content of 100% peracetic acid is approximately 21%.

The same hydroxyethylated starch derivative as in Examples 6 through 8 was used and thinned with peracetic acid at an Oa addition level of 2.0% on d.s.b. at 40° C. and 50° C. and two different pH levels.

Repeating the experiments at 40° C. with 0.5% Oa (as peracetic acid) and initial pHs of 1, 2, 4 and 6 lead to no thinning after 4-6 hours; thus higher Oa levels or higher temperatures are required for the thinning process with organic peracids compared to Caro's acid.

Example 10

This experiment represents the use of peroxodisulfates (e.g. $Na_2S_2O_8$, $(NH_4)_2S_2O_8$, $K_2S_2O_8$, etc.) or peroxidisulfuric acid ($H_2S_2O_8$) for thinning of granular starch below its pasting temperature.

The same hydroxyethylated starch derivative as in the previous examples was thinned at an Oa level (Oa of $Na_2O_8$ and $(NH_4)_2S_2O_8$ approximately 7%) of 0.5% at 40° C. and 55° C. and various pH levels using commercially available sodium peroxodisulfate (called sodium persulfate).

At 40° C., no thinning occurred at up to 6 hours reaction time. The trials were stopped at this point. At 0.5% Oa, the temperature level of 55° C. was required to achieve sufficient thinning during 2-3 hours. Higher pH slows the reaction down.

It can be assumed that only at uneconomically high Oa levels of 2% or more can a thinning reaction occur within reasonable reaction times.

Example 11

Because the thinning of granular starch with the described chemicals can involve very short reaction times of less than one hour, control of the reaction and desired fluidity might be difficult in an industrial process. The reaction time can be artificially extended by adding the active oxygen compound in several portions, thus lowering the initial concentration and increasing reaction time.

A hydroxyethylated starch derivative, as in Example 6, was thinned with a total of 0.4% Oa as Caro's acid at 50° C. and pH 0.2. By adding the Caro's acid in three portions (0.2% Oa in the beginning, 0.1% after 20 minutes and another 0.1% after 40 minutes), the total reaction time of 0.3 hours for a one-portion addition could be extended to one hour with almost identical results in terms of achieved fluidity and optical properties.

Examples 1 through 5 show that prior art processes either have the disadvantage of long reaction time (typically 5-10 hours) and/or higher temperature (typically 45° to 53° C.). The iron catalyzed thinning process (Example 3a) also results in a considerably undesirable yellowness of the final product; this can be seen as the overall lower brightness level, the higher yellowness parameter and the higher b* value. The yellowness could be somewhat improved by post-treatment with $Na_5DTPA$ chelant (Example 3b). However, such a post-treatment step is unsatisfactory because it requires an additional process step (an additional process step requires more control and results in lower productivity because it takes additional residence time per batch or in a continuous plant). The additional process step also requires additional chemical costs and, eventually, the use of undesirable chemicals when it comes, for example, to the production of food starches.

Examples 4 and 5 show that uncatalyzed hydrogen peroxide, even at pH below 1.0, has no or only limited efficiency.

Surprisingly, the employment of Caro's acid at various pH levels or the use of salts of Caro's acid shows extremely good thinning effects (Examples 6-8). Reaction times are very low (typically less than 2.5 hours) and reaction temperature is low (typically 40° C.).

Brightness/yellowness values of the thinned starches are as good or even better than commercially acid-thinned starch. The short reaction time which the present invention enables will increase productivity and lower effluent load. It is known to those skilled in the art that effluent load in starch processing increases with reaction time, reaction temperature and pH; these three critical parameters are kept low with the present process while maintaining or even improving product quality.

Thinning with organic peracids such as peracetic acid is possible as well, but higher concentrations (e.g., 2% Oa at 40° C.) of the chemical or higher temperatures (e.g., 50° C.) are required. However, the reaction time can be as low as 1.5 hours at 40° C. or one hour at 50° C., which is extremely short for starch thinning.

Peroxodisulfates at 0.5% Oa and 40° C., did not react sufficiently, but thinning occurred after 2-3 hours at higher temperature (55° C.), depending on pH.

Further variations and modifications of the invention will become apparent to those skilled in the art from the foregoing and are intended to be encompassed by the claims appended hereto.

TABLE 1

| | | | | Examples 1-6 | | | | | | |
|---|---|---|---|---|---|---|---|---|---|---|
| | Chemicals added on d.s.b. [%] | | | | | | | | | |
| Example # | $H_2O_2$ as Oa | $H_2SO_5$ as Oa | PAA as Oa | Car-oat ® as Oa | $Na_2S_2O_8$ as Oa | $FeSO_4$ $7H_2O$ | pH[1] | Temp. [°C.] | Reactn. Time [h] | Alkaline[2] Fluidity [ml] |
| Oa | — | — | — | — | — | — | — | — | — | nd |
| b | — | — | — | — | — | — | — | — | — | nd |
| 1a | — | — | — | — | — | — | 0.7 | 55 | 6.0 | 66 |
| b | — | — | — | — | — | — | 0.7 | 55 | 10.0 | 80 |
| 2 | — | — | — | — | — | — | 0.7 | 53 | 7.0 | 67 |
| 3a | 0.5 | — | — | — | — | 0.08 | 4.0 | 45 | 2.5 | 68 |
| b | 0.5 | — | — | — | — | 0.08 | 4.0 | 45 | 2.5 | 68 |
| 4 | 0.5 | — | — | — | — | — | 5.1 | 50 | 8.0 | 26 |
| 5a | 0.5 | — | — | — | — | — | 0.7 | 50 | 6.3 | 61 |
| b | 0.5 | — | — | — | — | — | 0.7 | 40 | 7.8 | 25 |
| 6a | — | 0.5 | — | — | — | — | 0.7 | 40 | 2.0 | 62 |
| b | — | 0.6 | — | — | — | — | 0.5 | 40 | 1.0 | 68 |
| c | — | 0.8 | — | — | — | — | 0.2 | 40 | 0.5 | 69 |
| d | — | 0.8 | — | — | — | — | 0.2 | 40 | 1.0 | 78 |
| e | — | 0.4 | — | — | — | — | 0.7 | 50 | 0.3 | 79 |

| | Optical Properties | | |
|---|---|---|---|
| | Brightness | a* | b* |

TABLE 1-continued

Examples 1-6

| Example # | R457 [%] | Yellow-ness | L* | Red-green | Yellow-blue | Notes |
|---|---|---|---|---|---|---|
| 0a | 86.1 | 7.1 | 96.6 | −0.2 | 3.9 | Unmodified granular corn starch |
| b | 88.3 | 5.6 | 97.1 | −0.1 | 3.1 | Unmodified hydroxy-ethylated starch |
| 1a | 88.3 | 7.5 | 97.4 | −0.3 | 4.2 | |
| b | nd | nd | nd | nd | nd | |
| 2 | 91.9 | 4.5 | 98.2 | −0.1 | 2.5 | |
| 3a | 79.1 | 11.5 | 94.4 | 0.6 | 5.9 | Treated with 0.14% Na5 DTPA to remove iron |
| b | 83.1 | 8.1 | 95.4 | 0.3 | 4.2 | |
| 4 | nd | nd | nd | nd | nd | |
| 5a | 92.1 | 4.6 | 98.3 | 0.0 | 2.5 | |
| b | nd | nd | nd | nd | nd | |
| 6a | 92.9 | 4.7 | 98.6 | 0.4 | 2.4 | |
| b | 91.8 | 5.1 | 98.3 | −0.2 | 2.8 | |
| c | 92.4 | 4.6 | 98.2 | 0 | 2.4 | |
| d | nd | nd | nd | nd | nd | |
| e | nd | nd | nd | nd | nd | |

[1] initial pH, after addition of oxidant.
[2] for 10 g dry starch and 2.0 N NaOH.
nd = not determined

TABLE 2

Examples 7-10

| Example # | H$_2$O$_2$ as Oa | H$_2$SO$_5$ as Oa | PAA as Oa | Car-oat® as Oa | Na$_2$S$_2$O$_8$ as Oa | FeSO$_4$ 7H$_2$O | pH[1] | Temp. [°C] | Reactn. Time [h] | Alkaline[2] Fluidity [ml] |
|---|---|---|---|---|---|---|---|---|---|---|
| 7a | — | 0.5 | — | — | — | — | 1.0 | 40 | 0.3 | 64 |
| b | — | 0.5 | — | — | — | — | 2.0 | 40 | 0.5 | 60 |
| c | — | 0.5 | — | — | — | — | 3.0 | 40 | 0.6 | 69 |
| d | — | 0.5 | — | — | — | — | 4.0 | 40 | 0.8 | 80 |
| e | — | 0.5 | — | — | — | — | 6.0 | 40 | 0.8 | 68 |
| f | — | 0.5 | — | — | — | — | 6.0 | 50 | 0.7 | 66 |
| 8a | — | — | — | 0.5 | — | — | 1.7 | 40 | 1.3 | 67 |
| b | — | — | — | 0.5 | — | — | 1.2 | 40 | 0.6 | 80 |
| 9a | — | — | 2.0 | — | — | — | 1.4 | 40 | 2.5 | 68 |
| b | — | — | 2.0 | — | — | — | 1.0 | 40 | 1.5 | 69 |
| c | — | — | 2.0 | — | — | — | 1.4 | 50 | 1.3 | 68 |
| d | — | — | 2.0 | — | — | — | 1.0 | 50 | 1.0 | 82 |
| 10a | — | — | — | — | 0.5 | — | 1.0 | 40 | >6 | <25 |
| b | — | — | — | — | 0.5 | — | 2.0 | 40 | >6 | <25 |
| c | — | — | — | — | 0.5 | — | 4.0 | 40 | >6 | <25 |
| d | — | — | — | — | 0.5 | — | 6.0 | 40 | >6 | <25 |
| e | — | — | — | — | 0.5 | — | 1.0 | 55 | 2.0 | 69 |
| f | — | — | — | — | 0.5 | — | 2.0 | 55 | 2.0 | 69 |
| g | — | — | — | — | 0.5 | — | 3.0 | 55 | 2.0 | 68 |
| h | — | — | — | — | 0.5 | — | 4.0 | 55 | 2.0 | 64 |
| i | — | — | — | — | 0.5 | — | 5.0 | 55 | 3.0 | 66 |
| j | — | — | — | — | 0.5 | — | 6.0 | 55 | 3.0 | 64 |

Optical Properties

| Example # | Brightness R457 [%] | Yellow-ness | L* | a* Red-green | b* Yellow-blue | Notes |
|---|---|---|---|---|---|---|
| 7a | 91.7 | 6.4 | 98.5 | −0.3 | 3.6 | |
| b | 92.8 | 5.3 | 98.8 | −0.2 | 2.9 | |
| c | 90.1 | 7.6 | 98.3 | −0.2 | 4.0 | |
| d | 91.6 | 5.9 | 98.5 | −0.3 | 3.3 | |
| e | 91.6 | 5.6 | 98.4 | −0.2 | 3.2 | |
| f | 91.5 | 5.5 | 98.3 | −0.1 | 3.0 | |
| 8a | 92.3 | nd | 98.5 | −0.2 | 2.8 | |
| b | 91.5 | nd | 98.4 | −0.1 | 3.1 | |
| 9a | 93.2 | nd | 98.8 | −0.2 | 2.6 | |
| b | 91.3 | nd | 98.5 | −0.1 | 2.5 | |
| c | nd | nd | nd | nd | nd | |
| d | nd | nd | nd | nd | nd | |

TABLE 2-continued

| | | Examples 7–10 | | | |
|---|---|---|---|---|---|
| 10a | nd | nd | nd | nd | nd |
| b | nd | nd | nd | nd | nd |
| c | nd | nd | nd | nd | nd |
| d | nd | nd | nd | nd | nd |
| e | nd | nd | nd | nd | nd |
| f | nd | nd | nd | nd | nd |
| g | nd | nd | nd | nd | nd |
| h | nd | nd | nd | nd | nd |
| i | nd | nd | nd | nd | nd |
| j | nd | nd | nd | nd | nd |

[1] initial pH, after addition of oxidant.
[2] for 10 g dry starch and 2.0 N NaOH.
nd = not determined

What is claimed is:

1. A process for degrading granular starch and starch derivatives comprising adding a peracid to an aqueous slurry of said starch, free of heavy metal catalyst, to initiate a degradation reaction, controlling the reaction by measuring the alkaline fluidity level, viscosity or molecular weight distribution, allowing the reaction to continue until the desired fluidity, molecular weight distribution, or viscosity is achieved, and thereafter terminating the reaction.

2. The process according to claim 1, wherein said reaction is terminated by lowering the temperature of said aqueous slurry, neutralizing the pH of said aqueous slurry, or adding a peroxide scavenger to said aqueous slurry.

3. The process according to claim 1, wherein said peracid is performic acid, peracetic acid or perpropionic acid.

4. The process according to claim 1, further comprising washing and recovering the degraded granular starch by filtration.

5. The process according to claim 1, wherein said peracid is added in one portion.

6. The process according to claim 1, wherein said peracid is added in more than one portion.

7. The process according to claim 1, wherein said process occurs prior to gelatinization.

8. The process according to claim 1, wherein said process occurs during gelatinization.

9. The process according to claim 1, wherein said peracid is added in an amount of 0.1 to $\leq 5\%$ based on dry starch.

10. The process according to claim 9, wherein said peracid is added in an amount of 0.1 to $\leq 2.5\%$ based on dry starch.

11. The process according to claim 10, wherein said peracid is added in an amount of 0.1 to $\leq 1\%$ based on dry starch.

12. The process according to claim 1, wherein the pH of said reaction is 0.2 to $\leq 12.5$.

13. The process according to claim 12, wherein the pH of said reaction is 0.2 to $\leq 8$.

14. The process according to claim 13, wherein the pH of said reaction is 0.2 to $\leq 6$.

15. The process according to claim 1, wherein the temperature of said reaction is approximately 30° to $\leq 100°$ C.

16. The process according to claim 15, wherein the temperature of said reaction is approximately 30° to $\leq 70°$ C.

17. The process according to claim 16, wherein the temperature of said reaction is approximately 30° to $\leq 55°$ C.

18. The process according to claim 1, wherein the reaction time of said reaction is approximately 20 minutes to $\leq 5$ hours.

19. The process according to claim 18, wherein the reaction time of said reaction is approximately 20 minutes to $\leq 3$ hours.

20. The process according to claim 19, wherein the reaction time of said reaction is approximately 20 minutes to $\leq 2$ hours.

21. The process according to claim 1, wherein said desired fluidity is 50–70 ml.

22. The process according to claim 21, wherein said desired fluidity is 60–70 ml.

23. The process according to claim 1, wherein said peracid is Caro's acid or a salt thereof.

24. The process according to claim 23, wherein said peracid is a potassium salt of Caro's acid.

25. The process according to claim 23, wherein the reaction temperature is approximately 40° C.

26. The process according to claim 23, wherein said Caro's acid or a salt thereof is added in an amount of 0.1 to $\leq 5\%$ based on dry starch.

27. The process according to claim 26, wherein said Caro's acid or a salt thereof is added in an amount of 0.1 to $\leq 2.5\%$ based on dry starch.

28. The process according to claim 27, wherein said Caro's acid or a salt thereof is added in an amount of 0.1 to $\leq 1\%$ based on dry starch.

29. The process according to claim 24, wherein the pH of said reaction is 0.2 to $\leq 12.5$.

30. The process according to claim 29, wherein the pH of said reaction is 0.2 to $\leq 8$.

31. The process according to claim 30, wherein the pH of said reaction is 0.2 to $\leq 4$.

32. The process according to claim 24, wherein the temperature of said reaction is approximately 30° to $\leq 100°$ C.

33. The process according to claim 33, wherein the temperature of said reaction is approximately 30° to $\leq 70°$ C.

34. The process according to claim 33, wherein the temperature of said reaction is approximately 30° to $\leq 50°$ C.

35. The process according to claim 24, wherein the reaction time of said reaction is approximately 20 minutes to $\leq 5$ hours.

36. The process according to claim 25, wherein the reaction time of said reaction is approximately 20 minutes to $\leq 3$ hours.

37. The process according to claim 36, wherein the reaction time of said reaction is approximately 20 minutes to $\leq 2$ hours.

38. A process for degrading granular starch and starch derivatives consisting essentially of adding a peracid to an aqueous slurry of said starch to initiate a degradation reaction and allowing the reaction to continue until the desired fluidity, molecular weight distribution, or viscosity is achieved, wherein said peracid is added to an amount of 0.1 to $\leq 5\%$ based on dry starch, wherein the pH of said reaction is 0.2 to $\leq 12.5$, wherein the temperature of said reaction is approximately 30° to $\leq 100°$ C., optionally terminating said reaction by lowering the temperature, neutralizing the pH, or adding a peroxide scavenger, and optionally washing and recovering the degraded granular starch by filtration.

* * * * *

UNITED STATES PATENT AND TRADEMARK OFFICE
CERTIFICATE OF CORRECTION

PATENT NO. : 5,362,868

DATED : November 8, 1994

INVENTOR(S) : Wilfried EUL ET AL

It is certified that error appears in the above-identified patent and that said Letters Patent is hereby corrected as shown below:

On the title page, item [73], Assignee, should read:
[73] Degussa Aktiengesellschaft Signed and Sealed this Seventh Day of February, 1995

Attest:

BRUCE LEHMAN

Attesting Officer

Commissioner of Patents and Trademarks